United States Patent [19]

Traubel et al.

[11] 3,715,326

[45] Feb. 6, 1973

[54] USING MONOISOCYANATES TO PREPARE MICROPOROUS POLYURETHANES

[75] Inventors: Harro Traubel, Leverkusen; Harald Oertel, Odenthal-Globusch, both of Germany

[73] Assignee: Bayer Aktiengesellschaft, Leverkusen, Germany

[22] Filed: Dec. 4, 1970

[21] Appl. No.: 95,345

Related U.S. Application Data

[63] Continuation-in-part of Ser. No. 696,096, Jan. 8, 1968, abandoned.

[30] Foreign Application Priority Data

Jan. 10, 1967 Germany.....................P 16 94 127.8

[52] U.S. Cl. .......260/2.5 AY, 117/161 KP, 161/190, 260/75 NT, 260/77.5 SP, 264/140
[51] Int. Cl............................C08g 22/44, C08g 22/20
[58] Field of Search...260/77.5 SP, 2.5 AY, 77.5 AT; 117/63, 135.5, 161 KP; 161/190; 264/140

[56] References Cited

UNITED STATES PATENTS

| | | | |
|---|---|---|---|
| 3,000,757 | 9/1961 | Johnston et al. | 117/63 |
| 3,208,875 | 9/1965 | Holden | 117/135.5 |
| 3,348,963 | 10/1967 | Ferkershima et al. | 117/63 |
| 3,377,308 | 4/1968 | Oertel et al. | 260/32.6 |
| 3,387,989 | 6/1968 | West et al. | 117/76 |
| 3,483,015 | 12/1969 | Ferkershima et al. | 117/3 |
| 3,484,273 | 12/1969 | Karvase et al. | 117/63 |
| 3,575,894 | 4/1971 | Zorn et al. | 260/2.5 |

*Primary Examiner*—Donald E. Czaja
*Assistant Examiner*—H. S. Cockeram
*Attorney*—Robert A. Gerlach

[57] ABSTRACT

Microporous foils and films are prepared from solutions of a polyurethane or polyurethane urea polymer in a strong polar solvent, the polymer having film forming properties and a molecular weight of at least 10,000 by mixing with the solution from 2 to 200 percent by weight based on the weight of the polymer of (1) and alkyl isocyanate or (2) a polar aliphatic compound having a melting point greater than 35° C. and at least one alkyl or alkylene substituent containing two to 24 carbon atoms, the aliphatic compound being a carboxylic acid amide, a urethane, a urea or a semicarbazide, shaping the solvent solution into a foil or film, removing the solvent and drying the film or foil at a temperature below the softening point of the polyurethane or polyurethane urea polymer.

5 Claims, No Drawings

USING MONOISOCYANATES TO PREPARE MICROPOROUS POLYURETHANES

This application is a continuation-in-part of copending application Ser. No. 696,096 filed Jan. 8, 1968 now abandoned.

This invention relates to microporous films and foils and to a method of preparing the same.

It is known to produce sheet structures that are permeable to water vapor by exposing solutions of polyether urethane or polyetherurethane ureas in hygroscopic solvents such as dimethylformamide or dimethylacetamide to a moist atmosphere for a specific residence time and then washing out the solvent with water, so that the polyurethane is coagulated (DAS 1,110,607). By this procedure sheet structures of sufficiently high microporosity can be obtained only from certain polyurethanes. Further, the operation necessary in the above procedure of first exposing the polyurethane solution to a moist atmosphere is not accurately reproducible and very considerably prolongs the processing time.

It is an object of this invention to provide improved microporous sheet structures. It is another object of this invention to provide an improved method of making microporous films and foils. It is a further object of this invention to provide microporous sheet structures having improved permeability to water vapor. It is still another object of this invention to provide hydrophobic microporous film and foils.

The foregoing objects and others are accomplished in accordance with the invention, generally speaking, by providing microporous films and foils prepared from solutions of a polyurethane or polyurethane urea polymers in a strong polar solvent, the polymer containing substantially no free terminal OH or $NH_2$ groups having film forming properties and a molecular weight of at least 10,000 corresponding to a tensile strength of at least 5 kgwt/cm² as determined according to IUP 6 (IUP = International Union for Physical Testing) published e.g. in "Das Leder" 1959, 14 – 18, by mixing with the solution from 2 to 200 percent by weight based on the weight of the polymer of (1) an alkyl isocyanate or (2) a polar aliphatic compound having a melting point greater than 35° C. and containing at least one alkyl or alkylene radical having two to 24, preferably eight to 24 carbon atoms, the aliphatic compound being a carboxylic acid amide, a urethane, a urea or a semicarbazide, or of an alkyl isocyanate having eight to 24 carbon atoms in the alkyl group shaping the solvent solution into a foil or film, removing the solvent and drying the film or foil at a temperature below the softening point of the polyurethane or polyurethane urea polymer.

With this procedure the uneconomical step of exposing the coatings of polyurethane solutions to a moist atmosphere is avoided. The process can thus be carried out more rapidly than the known processes. Moreover, with adding of the above mentioned polar aliphatic compounds any polyurethane solution is coagulated to microporous foils or coatings. The process is not limited to specially selected polyurethanes, e.g., polyether urethanes and obviates mixing other additives or involved measures for achieving coagulation to microporous foils that are permeable to water vapor.

Any polyurethanes and polyurethane ureas that are film forming, have a molecular weight of at least 10,000 and are soluble in organic, preferably highly polar solvents that will dissolve polyacrylonitrile such as dimethyl formamide, dimethylsulphoxide of dimethylacetamide are suitable for the process according to the invention.

Polyurethane ureas in the sense of this invention are film forming elastomeric polyurethane ureas which in addition to urethane groups contain groups —R'—NH—CO—NH— which may optionally also, be in the form of groups such as

—R'—NH—CO—NH—R

—R'—NH—CO—NH—NH—CO—R—

—R'—NH—CO—NH—NH—CO—NH—R—

—R'—NH—CO—NH—NH—CO—O—R

—R'—NH—CO—NH—N—R—
  |
  Alkyl

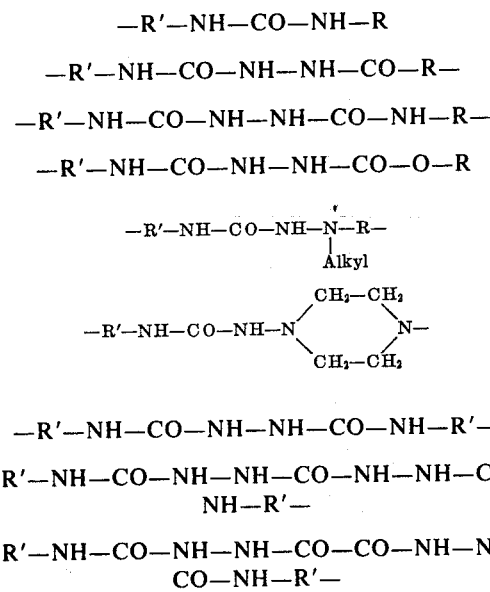

—R'—NH—CO—NH—NH—CO—NH—R'—

—R'—NH—CO—NH—NH—CO—NH—NH—CO—NH—R'—

—R'—NH—CO—NH—NH—CO—CO—NH—NH—CO—NH—R'— in which R' denotes the divalent organic radical of an organic diisocyanate and the radical R also denotes a divalent organic radical. These polyurethane ureas are preferably only soluble in highly polar solvents such as dimethylformamide.

Such "urea" groups are formed, e.g., in the reaction of diisocyanates, optionally diisocyanate prepolymers with bifunctional chain lengthening agents the hydrogen atoms of which are reactive with isocyanates being linked to nitrogen atoms, e.g. primary (di)-amines, hydrazine, carbohydrazide, (di)-hydrazines, (di)-hydrazides, (di)-semicarbazides or (di)-carbazic esters. Urea groups —R'—NH—CO—NH—R'— are also formed when the bifunctional chain lengthening agent used is water.

The elastomeric polyurethanes and polyurethane ureas to be used according to the invention can be prepared by known processes. Higher molecular weight, substantially linear polyhydroxyl compounds having terminal hydroxyl groups and a molecular weight between 500 and 5000 and, if desired, additional low molecular weight dihydric alcohols are reacted with an excess of diisocyanates first to produce a prepolymer having terminal isocyanate groups, and this is then reacted with water or with compounds that are bifunctional under the chosen reaction conditions and which have their hydrogen atoms that are reactive to isocyanates linked to oxygen and/or nitrogen atoms. When diols are used as reactant with the diisocyanate prepolymers this chain lengthening reaction is preferably carried out in the melt or in inert solvents such as tetrahydrofuran or dioxane. Direct reaction of higher molecular weight dihydroxy compounds and diol mixtures with diisocyanates in the melt or inert solvents to form polyurethane is also possible. Owing to the substantially higher reactivity and reaction velocity compared with diols, the chain lengthening reaction with NH-functional chain lengthening agents is preferably carried out in highly polar, water-soluble solvents that have a boiling point above 100° C.

The preparation of such polyurethane urea solutions is described for example, in German Pat. specification Nos. 888,766; 1,123,467; 1,150,517; and 1,154,937; in German Auslegeschriften 1,161,007; 1,183,196 and 1,186,618; in Belgian Pat. specification Nos. 649,619; 646,637; 658,363, 664,344, 664,346; and 666,208; in French Pat. specification Nos. 1,360,082; 1,371,391 and 1,383,077; and in U.S. Pat. specification Nos. 2,929,803; 2,929,804 and 3,040,003.

Suitable higher molecular weight, substantially linear polyhydroxyl compounds having terminal hydroxyl groups are, for example, poly-esters, polyester amides, polyethers, polyacetates, polycarbonates or poly-N-alkylurethanes or mixtures thereof which may, if desired, have ester, ether, amide, urethane or N-alkylurethane groups, and which have molecular weights between 500 and 5000 and melting points suitably below 60° C. and preferably below 45° C.

Especially to be mentioned are polyesters of adipic acid and if desired mixtures of dialcohols such as ethylene glycol, propylene glycol, butanediol-(1,4), hexanediol-(2,5), 2,2-dimethyl-propanediol-(1,3), hexanediol-(1,6)- 2-methyl-hexanediol-(1,6), 2,2-dimethyl-hexanediol-(1,3), p-bis-hydroxymethyl-cyclohexane, 3-methyl-pentanediol-(1,4), and 2,2-diethyl-propanediol-(1,3), preferably those with diols or mixtures of diols having 5 or more C-atoms since such polyesters have relatively high resistance to hydrolysis and, especially if diols with alkyl radicals in the side chains are included, also good elasticity at low temperature in the end products. Other dicarboxylic acids such as succinic, suberic, oxalic, malonic, maleic, glutaric, fumaric, methyladipic and the like, may also be used. Polyesters obtained by polymerization of caprolactone with diethylene glycol with narrow molecular weight distribution are also suitable starting materials.

Polyurethane and polyurethane ureas with excellent resistance to hydrolysis can be obtained from polyalkylene ethers such as polytrimethylene ether diols or polypropylene glycols and preferably from polytetramethylene ether diols, which may, if desired, also be used as mixed polyethers (by incorporating by condensation small quantities of epoxides such as propylene oxide or epichlorohydrin) or after end group modification, e.g., replacement of the OH group by the group —O—CO—N(alkyl)—CH$_2$—CH$_2$—OH. Also suitable for flame resistance products are polyepichlorohydrins having terminal OH groups, within the given molecular weight range.

The process according to the invention can unexpectedly also be carried out with polyhydroxyl compounds that are miscible with water, e.g. polyethylene ether diols, in which case polyurethanes that have a high water uptake are obtained.

Suitable diisocyanates are aliphatic, cycloaliphatic, araliphatic, aromatic and heterocyclic diisocyanates, and if desired mixtures thereof. Especially to be mentioned are diisocyanates of symmetrical structure, e.g. diphenylmethane-4,4'-diisocyanate, diphenyl-dimethylmethane-4,4'-diiso-cyanate, 2,2,',6,6'-tetramethyl-diphenylmethane-4,4'-diisocyanate, diphenyl-4,4'-diisocyanate, diphenylether-4,4'-diisocyanate or their alkyl-, alkoxy- or halogen-substituted derivatives, and toluylene-2,4- or 2-6-diisocyanate or their commercial mixtures, 2,4-diisopropylphenylene-1,3-diisocyanate, m-xylylenediisocyanate, p-xylylenediisocyanate and a,a,a',a'-tetramethyl-p-xylene diisocyanate and alkyl- or halogen-substitution products of the above diisocyanates, e.g. 2,5-dichloro-p-xylylene-diisocyanate or tetrachloro-p-phenylene-diisocyanate, dimeric toluylene-2,4-diisocyanate, bis-(3-methyl-4-isocyanatophenyl)-urea or naphthalene-1,5-diisocyanate. Aliphatic diisocyanates such as hexane-1,6-diisocyanate, cyclohexane-1,4-diisocyanate, dicyclohexylmethane-4,4'-diisocyanate, 1isocyanato-3-isocyanato-3-isocyanato-methyl-3,5,5-trimethyl-cyclohexane or 2,2,4-trimethylhexane-1,6-diisocyanate may also be used in minor proportions, and they yield products which undergo very little discoloration on exposure to light. Diisocyanates such as ω, ω'-di-(isocyanatoethyl)-benzene or 1,2,3,4,5,6-hexa-hydro-diphenylmethane-4,4'-diisocyanate also yield products that undergo little discoloration on exposure to light.

Owing to their technological accessibility and their properties, it is preferred to use diphenylmethane-4,4'-diisocyanate, the isomeric toluylene diisocyanates and, if desired, certain amounts of hexane-1,6-diisocyanate and dicyclohexylmethane-4,4'-diisocyanate.

The higher molecular weight polyhydroxyl compounds are reacted with the diisocyanates in a molar ratio of about 1 : 1.25 to 1 : 4 if desired in several stages in the melt or in solvents that are inert to isocyanates, such as tetrahydrofuran, dioxane or chlorobenzene, at temperatures of about 40° C. to 130° and preferably 70° C. to 100° C. The reaction times observed are such that a substantially linear prepolymer with terminal NCO groups is obtained which when reacted with substantially equivalent quantities of bifunctional chain lengthening agents yields a substantially linear elastomeric polyurethane or polyurethane urea soluble in highly polar sol-vents such as dimethylformamide.

If the polyhydroxyl compound is of low molecular weight, e.g. 750 to 1250, the reaction with diisocyanates is preferably carried out using low NCO/OH ratios, e.g., 2 : 1 to 1.25 : 1, whereas if the polyhydroxyl compound has a high molecular weight, e.g. 1700 to 2500, the reaction is preferably carried out using high NCO/OH ratios, e.g., 3 : 1 to 1.65 : 1.

In addition to the higher molecular weight polyhydroxyl compounds, there may also be included low molecular weight diols (molecular weight preferably below 150), e.g. ethylene glycol, butanediol-(1,4), bis-N,N-(b-hydroxyethyl)-methylamine, bis-N,N-(b-hydroxypropyl)-methylamine, N,N'-bis-hydroxylethylpiperazine or hydroquinone-bis-(b-hydroxyethylether) in quantities of, for example, 10 to 300 mols percent of the OH content, preferably 20 to 100 mols percent of the higher molecular weight polyhydroxyl compound. The addition of diols with tertiary nitrogen enhances in particular the dyeability, improves the fastness to light and provides a point of contact for further after-treatments, e.g. cross-linking for example with compounds that have a powerful alkylating action such as 4,4'-dichloromethyldiphenyl-ether.

The NCO-content of the prepolymer (based on solvent-free preadduct) is of importance for the properties of the polyurethanes obtained from them. It should amount to at least 0.50 percent by weight and preferably between about 1 and about 7.6 percent by weight, and especially between about 1.5 and 4 percent by weight in order that the polyurethanes may have sufficiently high melting points, tear resistance, elongation at break and tension values. If the chain lengthening reaction is carried out with water, the NCO content should preferably be higher, e.g., between 3.5 and 7.6 percent by weight, since a part of the NCO groups is, formally, first saponified to amino groups. The chain lengthening agents should have a molecular weight of 18 to about 500, preferably 32 to 350. Apart from water, suitable agents to be used, if desired as mixtures, are ethylene glycol, propylene glycol, butanediol-(1,4), hexanediol-(1,6), hydroquinone-bis-(b-hydroxyethylether), p-xylylene glycol, and in addition, ethylene diamine, 1,2- or 1,3-propylenediamine, 1,4-tetramethylene diamine, 1,6-hexamethylenediamine, 2,2,4-trimethylhexanediamine-(1,6), 1-methylcyclohexane-2,4-diamine, 1-amino-3-aminomethyl-3,5,5-trimethyl-cyclohexane, 4,4'-diamino-dicyclohexyl-methane, bis-(aminopropyl)-piperazine, or aromatic diprimary amines such as 4,4'-diamino-diphenylmethane, 4,4'-diamino-diphenylsulphide, 4,4'-diamino-diphenylether, 1-methyl-2,4-diaminobenzene or araliphatic diprimary diamines such as m-xylylene diamine, p-xylylenediamine, a,a,a',a'-tetramethyl-p-xylylenediamine, 1,3-bis-(b-amino-isopropyl)-benzene, and diamines which contain sulphonic acid groups, e.g. 4,4'-diamino-stilbene-2,2'-disulphonic acid or 4,4'-diaminodiphenylethane-2,2'-disulphonic acid, ethylene diamine-N-butylsulphonic acid, hexamethylenediamine-1,6-butylsulphonic acid, 1,6-diamino-hexamethylene-3-sulphonic acid, or their alkali metal salts, hydrazides such as carbodihydrazide, oxalic acid dihydrazide, malonic acid dihydrazide, succinic acid dihydrazide and hydracrylic acid dihydrazide, p-phenylenediacetic acid dihydrazide hydroquinone diacetic acid dihydrazide, N-methyl-bis-propionic acid hydrazide), N-N'-piperazine-bis-(propionic acid hydrazide), isophthalic acid dihydrazide, m- and p-cyclohexane dicarboxylic acid hydrazide (cis/trans), hexa-methylene-bis-simicarbazide, butanol-bis-carbazic acid ester, amino-acetic acid hydrazide, and in addition, hydrazine, e.g. also in the form of hydrazine hydrate, as well as dihydrazines such as N,N'-diaminopiperazine.

Secondary diamines may also be used (but should be used in quantities of less than 30 mols per cent), preferably those that have a symmetrical structure, such as piperazine or 2,5-dimethylpiperazine.

In order to keep the molecular weight low or in order to obtain polyurethane elastomers that are still soluble in spite of a certain amount of molecular branching, one may also include minor quantities of monofunctional compounds, e.g. 0.1 to 10 mols per cent (based on the NCO content), e.g., of butylamine, butyl semicarbazide or N,N'-dimethylhydrazine.

Preferred chain lengthening agents are ethylene diamine, m-xylylenediamine, hydrazine, carbodihydrazide, oxalic or malonic acid dihydrazide, aminoacetic acid hydrazide or water; these preferably should amount to at least 50 mols per cent and preferably more than 80 mols per cent of the total quantity of chain lengthening agents used. The use of mixtures of chain lengthening agents usually has the effect of an increase in the solubility of the polyurethane urea and reduction in the melting point of the elastomers.

If diols are used, the reaction with chain lengthening agents is preferably carried out in the melt, whereas if NH-functional chain lengthening agents are used the reaction is carried out in highly polar water-soluble solvents boiling above 100° C. Examples to be mentioned are solvents which contain amide or sulphoxide groups and are capable of forming strong hydrogen bridge bonds, for example dimethylformamide, diethylformamide, dimethylacetamide, formylmoropholine hexamethylphosphoramide, dimethylsulphoxide, dimethylcyanamide, or their mixtures. Technically, the preferred solvent is dimethylformamide. Up to a certain proportion, about 33 percent by weight of the quantity of solvent, less highly polar solvents which are not capable on their own of dissolving the polyurethanes or polyurethane ureas may be added to the highly polar solvents, e.g. tetrahydrofuran, dioxane, acetone or glycol monomethylether acetate. The concentration of elastomer solutions should preferably be about 5 to 43 percent by weight, especially 15 to 27 percent by weight, and the viscosities should preferably be between 1 to 1000 poises, especially between 50 and 800 poises/20° C.

The NH-functional chain lengthening agents generally react very rapidly with the prepolymer to form polyurethane ureas, so that the chain lengthening reaction is generally carried out, either continuously or a portion at a time at temperatures below 100° C., e.g. in the case of the relatively sparingly soluble dihydrazide compounds at about 50° to 70° C. In most cases, room temperature is sufficient, and in the case of the highly reactive aliphatic diamines or hydrazine, the reaction may sometimes be carried out with cooling, e.g. to −10° C., or preferably the reaction is not carried out with free hydrazine or diamines but with the suspensions of carbazic acids or aminocarbonates formed by the addition of $CO_2$ (according to German Auslegeschriften 1,222,253 and 1,223,154), which enables the reaction to be carried out safely at room temperature or elevated temperatures, e.g. 65° C.

The reaction of the prepolymers is carried out with about equivalent or excess quantities (e.g. 1 to 20 mols per cent excess) of chain lengthening agents. The greater the excess of chain lengthening agents, the lower will be the molecular weight of the polyurethane or polyurethane urea. By careful addition of other, preferably less highly reactive aliphatic di- or triisocyanates, the molecular weight or solution viscosity can be adjusted to the desired value (according to German Patent Specification 1,157,386).

When the desired viscosity has been reached, the end groups can be reacted with monoisocyanates such as butyl isocyanate, anhydrides or other acrylating substances, e.g., acid chlorides or carbamic acid chlorides, for the purpose of stabilization.

Organic or inorganic pigments, dyes, optical brightening agents, UV absorbents, phenolic antioxidants, special light protective agents such as N,N-dialkyl semicarbazides, or N,N-dialkylhydrazides and cross-linking compounds such as paraformaldehyde, melamine hexamethylolether or other formaldehyde derivatives such as dimethylol-dihydroxy-ethyleneurea, dimethylolethyleneurea, trimethylolmelamine, dimethylolurea-dimethylether, quaternizing agents such as dichloromethyldurene or polyaziridineureas, e.g., hexamethylene-ω,ω-bis-ethyleneimide-urea, may be added to the solutions of polyurethanes or polyurethane ureas. The resistance to dissolving or swelling in highly polar solvents is modified by a cross-linking reaction, e.g. one that is released thermally. Owing to the fact that the polyurethane urea elastomers to be used according to the invention are built up of "soft segments" (polyhydroxyl compounds) and "hard segments" (the portions of the molecule that can be thought of as built up of diisocyanates and NH-chain lengthening agents or water), they manifest the properties of "crosslinked" elastomers in spite of their substantially linear structure. This "crosslinking" is typically effected by the powerful hydrogen bridge subsidiary valency bonds within the urethane segments and especially within the "urea segments."

Mechanical and elastic properties can be determined on films of these polyurethane or polyurethane urea solutions prepared by drying on glass plates at 100° C., e.g., after cutting up the films into strips or filaments. Solutions that are especially suitable for the process according to the invention are those whose films have the following properties;

1. Melting point on the Kofler bench at least 150° C., preferably above 200° C.
2. Tensile strengths of at least about 100 kg/cm², preferably above 200 kg/cm².
3. Elongations at break of at least 200 percent, preferably 400 to 800 percent.
4. Tensional resilience at the first elongation to 20 percent of at least 1 kg/cm², preferably 5 to 30 kg/cm², at elongation to 100%, at least 5 kg/cm², preferably 20 to 75 kg/cm².
5. A molecular weight which corresponds to the viscosity $\eta = \ln\eta_R/C$ 0.5, preferably 0.70 to 1.9, when 1.0 g of elastomer at 20° C. is dissolved in 100 ml of hexamethyl phosphoramide (phosphoric acid tris-dimethylamide) at 20° C. In this formula, $\eta_R$ denotes the relative viscosity and C the concentration in g/100 ml:
6. In addition, these polyurethanes should no longer be soluble in only slightly polar solvents such as tetrahydrofuran, dioxane or glycol monomethylether acetate (without degradation) but only in highly polar solvents such as dimethylformamide.

According to the invention the polar aliphatic compound is a carboxylic acid amide, a urethane, a urea or a semicarbazide having a melting point of above 35° C. and containing at least one alkyl radical having two to 24 carbon atoms, preferably eight to 24 carbon atoms. The term alkyl radical is understood to comprise also alkylene radicals of the same chain length. The compound may thus contain one alkyl radical, or more than one alkyl radical and/or one alkylene radical for more than one alkylene radical.

Suitable compounds of this type correspond to the general formulas:

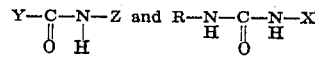

wherein

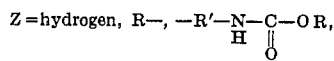

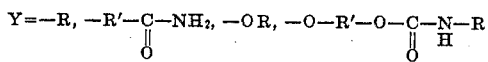

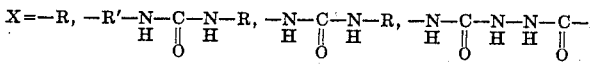

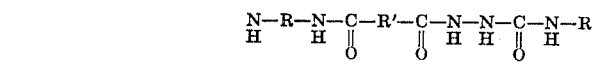

R = alkyl having two to 24 carbon atoms, preferably eight to 24 carbon atoms.
R'= alkylene having two to 24 carbon atoms, preferably eight to 24 carbon atoms.

Examples of radical R are ethyl, propyl, isopropyl, butyl, isobutyl, hexyl, octyl, decyl, dodecyl, hexadecyl, icosyl, docesyl, tricosyl and tetracosyl. Examples of radical R' are the same as the radical R only one more hydrogen being removed.

Within the scope of the above generic formula the preferred polar aliphatic compounds of this invention have the more specific formula:

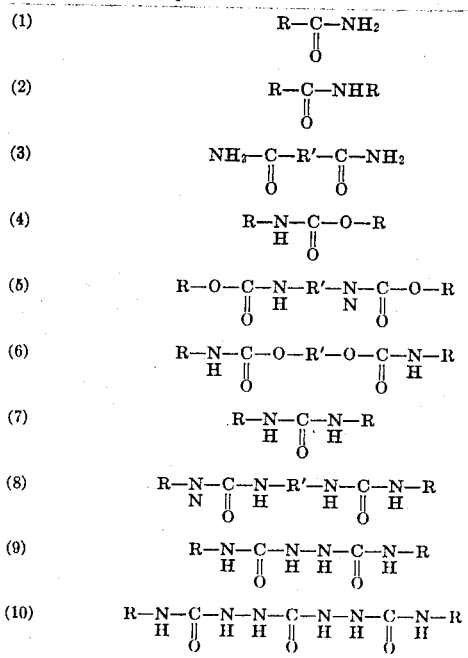

wherein R and R' are as described hereinbefore.

Some specific examples of suitable polar aliphatic compounds to be used in the practice of this invention within the scope of the generic and specific formula set out hereinbefore are: stearylamide, palmitylamide, 2-ethylcaproic acid - N - stearylamide, stearyl-N-aminomorpholide, sebacic acid diamide, N-stearyl-O-ethylurethane, N-stearyl-O-decylurethane, N-stearyl-O-stearylurethane, N-cetyl-O-stearylurethane, hexamethylene-bis-O-stearylurethane, hexamethylene-bis-O-cyclohexlurethane, butylene-bis-O-stearylurethane, hexamethylene-bis-O-cetylurethane, N,N'-distearylurea, N-stearyl-N'-butylurea, N-stearyl-N'-cetylurea, N- tetradecyl-N'-cyclo-hexylurea, N-hexadecyl-N'-(p-methyl-phenyl)-erra, N,N'-piperazine-bis-stearylurea N,N'-hexamethylene-bis-stearylurea, N,N'-ethylene-bis-cyclohexylurea, dodecylene-(N-cyclohexyl, N'-phenyl)-bis-urea, distearylsemicarbazide, dimyristyl-semicarbazide, N,N-distearly-N,N'-dimethylsemicarbazide, N,N'-dicyclohexylsemicarbazide, di-N,N'(N-carboxycetylamino)terephthalyldihydrazide, di-N,N'(-N-carboxy-hexamethyleneamino)adipic acid dihydrazide.

It is to be understood that the foregoing specific compounds are only a few compounds representative of the many polar aliphatic compounds within the scope of the formula outlined herein which are operable in the practice of this invention. Thus, for example in formula 1 and 2 R may be any alkyl radical having two to 24 carbon atoms as enumerated hereinbefore in the definition of R in the generic formula. Likewise in formula 3, R' may be any alkylene radical having from two to 24 carbon atoms as enumerated hereinbefore in the definition of R' in the generic formula. Further, with respect to the urethanes of formula 4,5 and 6, with regard to the ureas for formula 7 and 8, with regard to the semicarbazide of formula 9 and with respect to the dihydrazide of formula 10, R and R' of the more specific formula may be any alkyl or alkylene group respectively having from two to 24 carbon atoms as already outlined hereinbefore in the definition of R and R' for the generic formula. Accordingly it is clear that the foregoing examples are only illustrative of the fact that all compounds within the scope of the generic formula are suitable in the practice of the invention as long as at least one group of the formula

and at least one alkyl radical is present.

These compounds may be made in known manner from isocyanates (especially of the formula R—NCO or R'—(NCO)$_2$ where R and R' are as defined for the generic formula) and suitable alcohols, amines, hydrazines or ammonia as disclosed, for example, in U.S. Pat. No. 3,201,372.

As an example stearyl isocyanate and palmitylalcohol yields N-palmity-O-stearylurethane, stearylisocyanate and stearylamine yields N,N'-distearylurea, stearylisocyanate and dimethylhydrazine yields N,N'''-distearyl, N'N''-dimethylsemicarbazide.

Instead of pure starting materials mixtures may also be used, e.g. of alcohols or amines.

If polyfunctional compounds such as polyhydric alcohols, amines or dihydrazides, e.g. ethylene glycol, hexanediol, dodecane diol, trimethylol propane or ethylene diamine, hexamethylenediamine, piperazine N,N'-piperazine-bis-propylamine, carbodihydrazide or malonic acid dihydrazide are used for the reaction with the long chained isocyanates, compounds having two or more long chain radicals are produced, e.g. ethylene-bis-stearylurea or piperazine-bis-stearylurea.

Also suitable as polar aliphatic compounds are monoalkyl isocyanates of the formula R''—NCO wherein R'' is an alkyl radical having eight to 24 carbon atoms. Suitable examples of such monoalkyl isocyanates are octylisocyanate, decylisocyanate, hexadecylisocyanate, octadecylisocyanate, tricosylisocyanate and tetracosylisocyanate; stearylisocyanate is preferred.

Usually these compounds are added to the solvent solution of the polymeric polyurethane (urea) before the shaping process is carried out, at least, however, before the solvent is removed.

The polar aliphatic long chain compounds are generally added in quantities of 2 to 200 percent, preferably 3 to 150 percent and in particular 10 to 100 percent by weight based on the polyurethane solids content of the solution. As will be clear from the examples, the permeability to water vapor can be influenced by the quantity added. Since, however, the technological properties in general deteriorate with increasing permeability to water vapor porosity, the longer chain polar aliphatic compound will generally not be added in quantity of more than 100 percent based on the polyurethane or polyurethane urea solution although this would in principle be possible.

In the case of aliphatic polar compounds which contain reactive groups, it is advisable to heat the reaction mixture to 60° to 80° C. for about 30 minutes after addition and with thorough mixing of the reactants. This applies especially to isocyanates used as additives. In this case, the reaction of isocyanate with polyurethane can be catalyzed with known catalysts such as di-azabicyclo-octane, ureas, tertiary amines or compounds of lead, tin, cobalt or zinc (see Saunders and Frisch, "Polyurethanes" Part 1, New York 1962, 212).

Apart from the polar aliphatic compounds, the polyurethane or polyurethane urea solution may also have added to it dyes, fillers, other polymers (such as polyvinyl chloride, -acetate, -alcohols, acylated cellulose derivatives, ABS polymers acrylates etc.) and formaldehyde splitters such as paraformaldehyde or methylol- or methylolether derivatives such as dimethylolurea, adipic acid dimethyloldiamide or melamine hexane methylol hexane methyl ether as crosslinked agents.

The polyurethane or polyurethane urea solution to which a polar aliphatic compound has been added and which may, in addition, contain other additives, is applied by the usual methods, e.g., spraying, application with wiper, rolling, casting or painting) on to permeable or impermeable substrates. Examples of such substrates are fleeces, knitted or woven textiles, split, grain or fiber leather. Examples of impermeable substrates are glass plates, metal dies, silicone rubber dies or silicone treated backing paper. When the polymer solution has been shaped, it is dipped into a non-solvent for the polymer. Suitable non-solvents, which should preferably be miscible with the solvent, are water, methanol, ethanol, propanol, butanol, hexanol, ethers such as di-N-butyl ether and di-N-propyl ether, mineral oil and turpentine. Suitable non-solvents are especially those solvents which do not cause the sample of the film of the polymer to swell by more than 50 percent by weight in the course of 24 hours at the temperature at which the process is carried out (generally room temperature). The film is then washed with the non-solvent until the solvent has been removed.

The microporous sheet structures obtained by washing out the solvent can be finished directly by the methods used for leather or artificial leather if porous supports are used. If non-porous supports are used, the dry sheet structure should be glued on to porous substrates by means of discontinuous layers of adhesive in accordance with the known reversal process, and can then be finished by the usual methods.

The invention will be further illustrated by the following examples in which parts are by weight unless otherwise specified.

PREPARATION OF STARTING MATERIALS

Polyurethane or Polyurethane Urea Polymers (Properties given in Table 1).

METHOD OF PREPARATION A 1

About 13,000 parts of mixed polyester of adipic acid and 1,6-hexanediol/2,2-dimethylpropanediol-(1,3) (molar ratio of glycol mixture 65:35) of OH number 63,78, which copolyester has been dehydrated for about one hour at about 130° C./12 mm Hg, are stirred together with about 3,168 parts of diphenylmethane-4,4'-diisocyanate (molar ratio of polyester/ diisocyanate = 1 : 1.75) and raised to an internal temperature of 96° to 98° C. and kept at this temperature for about 70 minutes. About 15,000 parts of the hot NCO prepolymer melt are introduced into an approximately 60° C. hot solution of about 442 parts of carbohydrazide in about 43,358 parts of dimethylformamide, a homogeneous elastomer solution having a viscosity of 220 poises being produced. On addition of about 5.06 parts of hexane-1,6-diisocyanate, the viscosity rises to 280 poises/20° C. The $\eta$ value of a 1.0 percent by solution of the elastomer substance is hexamethylphosphoramide at 20° C. is 0.97.

METHOD OF PREPARATION A 2

About 1200 parts of a mixed polyester of adipic acid and ethylene glycol/butanediol-(1,4) (molar ratio of glycols 1:1) having an OH number of 56.3 are converted into an NCO prepolymer melt (3.24% NCO) by heating together with about 30 parts of dimethylmethane-4,4'-diisocyanate for about 30 minutes at 95° to 98° C.

About 400 parts of the NCO preadduct melt are introduced with intensive stirring at room temperature into a suspension of aminocarbonates prepared by throwing about 40 parts of carbon dioxide snow into a solution of about 22.6 parts of m-xylylene diamine in about 1268 parts of dimethylformamide, $CO_2$ being split off from the aminocarbonates to yield a highly viscous, homogeneous elastomer solution which is diluted with about 150 parts of dimethylformamide to a viscosity of 550 poises/20° C.

METHOD OF PREPARATION A 3

About 430 parts of the NCO prepolymer melt from Example A 2 heated for a further 130 minutes at about 96° C., the NCO content of which melt is then 3.05 percent, are mixed with a solution of about 30.9 parts of 4,4'-diamino-diphenylmethane in about 1460 parts of dimethylformamide. The viscosity of the brownish colored solution rises in the course of several hours to 516 poises/20° C.

METHOD OF PREPARATION A 4

About 800 parts of a polyester of adipic acid and ethylene glycol (OH number 55.25) are heated to 97° to 98° C. for about 25 minutes together with about 249 parts of diphenylmethane-4,4'-diisocyanate (molar ratio 1 : 2.5). About 600 parts of the NCO prepolymer melt (4.65% NCO) are stirred together with a solution of about 6 parts of water in about 1794 parts of dimethylformamide. The viscosity of the brownish colored elastomer solution rises within 48 hours to 44 poises/20° C.

METHOD OF PREPARATION A 5

About 800 parts of a mixed polyester of adipic acid and 1,6-hexanediol/2,2-dimethylpropanediol-(1,3) (glycol mixture in the molar ratio 65 : 35) (OH number 67.75) are heated with about 160 parts of hexane-1,6-diisocyanate (molar ratio 1 : 2) for about 200 minutes at about 98° C. About 637 parts of the NCO prepolymer melt (4% NCO) are mixed with a solution of about 27.38 parts of carbohydrazide in about 1883 parts of dimethylacetamide, the viscosity then slowly rising to 130 poises/20° C.

Elastomer films obtained from the solution by evaporation of the solvent at about 100° C. show excellent resistance to yellowing and mechanical degradation in the light.

METHOD OF PREPARATION A 6

About 1200 parts of the copolyester described in A 1, which has OH number of 67.3, are heated together with about 32.5 parts of butanediol-(1,4) and about 400 parts of diphenylmethane-4,4'-diisocyanate at about 97° C. for about 30 minutes, and about 600 parts of this NCO prepolymer melt (2.32% NCO) are then introduced into a carbazic acid suspension prepared from a solution of about 9.2 parts of hydrazine hydrate in about 2150 parts of dimethylformamide and carbon dioxide with formation of an elastomer solution which has a viscosity of 435 poises/20° C.

METHOD OF PREPARATION A 7:

About 800 parts of the copolymer described in A 1 and about 162.5 parts of diphenylmethane-4,4'-diisocyanate are heated to about 98° C. for about 30 minutes, a highly viscous NCO prepolymer being formed which is diluted with about 240 parts of anhydrous dioxane and heated for another 20 minutes to about 98° C. After cooling, the NCO content of the solution is 1.018 percent (the NCO content of the solvent-free NCO adduct is calculated from this to be 1.27 percent).

About 727 parts of this NCO prepolymer solution are added with intensive mixing to a solution of about 8.22 parts of carbohydrazide in about 1532 parts of dimethylformamide, a homogeneous, clear elastomer solution having a viscosity of 271 poises/20° C. at 26% solids concentration being obtained.

METHOD OF PREPARATION A 8

About 1200 parts of a mixed polyester of composition according to A 1 having a molecular weight of about 1670 are reacted with about 360 parts of diphenylmethane-4,4'-diisocyanate in the melt for about 50 minutes.

About 635 parts of the NCO prepolymer melt are introduced into a solution of about 26.3 parts of carbodihydrazide in about 1874 parts of dimethylformamide with formation of a viscous solution (460 poises/20° C.).

METHOD OF PREPARATION A 9

About 800 parts of a polytetramethyleneether diol (molecular weight 1020) and about 68 parts of toluylene diisocyanate (2,4-/2,6-isomeric mixture in the ratio of 80 : 20) are heated with about 50 parts of dioxane for about 20 minutes at about 80° C., mixed with about 195 parts of diphenylmethane-4,4'-diisocyanate and about 69 parts of dioxane and reacted for a further 33 minutes at about 80° C. to form an NCO prepolymer solution.

About 376.3 parts of this NCO prepolymer solution are introduced into a solution of about 10.25 parts of carbodihydrazide in about 940 parts of dimethylformamide with formation of a viscous, homogeneous elastomer solution having a viscosity of 104 poises/20° C.

About 1 percent by weight of poly-b-diethylaminoethyl-methacrylate, about 0.5 percent by weight of tris-(3,5-di-tertiary-butyl-4-hydroxybenzyl)-mesitylene and about 0.5 percent of 5-chloro-2-(2'-hydroxy-3'-methyl-5-tertiary-butyl-phenyl)-bensotriazole are added to the elastomer solution as stabilizers.

METHOD OF PREPARATION A 10

About 376.2 parts of the NCO prepolymer solution described in A 9 are stirred into a suspension prepared by throwing about 10 parts of solid carbon dioxide into a solution of about 5.88 parts of hydrazine hydrate in about 925 parts of dimethylformamide. The elastomer solution (121 poises/20° C.) is treated with the quantities of stabilizers mentioned in A 9.

METHOD OF PREPARATION A 11

About 13,000 parts of a mixed polyester of the composition according to A 1 and having a molecular weight of 1650 are mixed with about 129 parts of bis-b-hydroxypropylmethylamine, and about 1900 parts of diphenylmethane-4,4'-diisocyanate are added at about 60° C. and the reaction mixture is then heated to an internal temperature of 90° to 98° C. for about 50 minutes. About 15,610 parts of this NCO prepolymer melt are then stirred into a suspension prepared by throwing about 500 parts of carbon dioxide snow into a solution of about 287 parts of ethylene diamine and about 38.6 parts of 1,2-propylene diamine in 46,074 parts of dimethylformamide, $CO_2$ being split off and a highly viscous elastomer solution (510 poises/20° C.) obtained.

About 1.2 percent by weight (based on the solids content) of hexamethylene-N,N,N',N'-tetramethyl-bis-semicarbazide are incorporated with the solution as stabilizer.

METHOD OF PREPARATION A 12:

About 100 parts of a mixed polyester of adipic acid and ethylene glycol-butane diol-(1,4) (molar ratio of glycols 1 : 1), about 167 parts of hydroquinone-bis-b-hydroxyethylether, about 34.5 parts of butanediol-(1,4) and about 450 parts of diphenylmethane-4,4'-diisocyanate are mixed in the melt at about 100° C. and reacted for about 30 minutes at about 130° C. to form the polyurethane, and this polyurethane is cast to form thin plates which are then subsequently heated at about 100° C. for about 12 hours.

About 1200 parts of polyurethane (in the form of a granulate) are dissolved with about 9600 parts of dimethylformamide at 70° C. to 100° C. to form a polyurethane solution having a solids content of 20 percent and a viscosity of 217 poises/20° C.

METHOD OF PREPARATION B 1

N,N' Distearyl-urea $C_{17}H_{35}$—NH—CO—NH—$C_{17}H_{35}$

About 51 parts of stearylamine in about 200 parts of acetone are mixed with about 56.2 parts of stearylisocyanate in about 150 parts of acetone with stirring. The urea which crystallized out is separated by suction filtration. Yield 120 parts, m.p. 103°–104.5° C.

METHOD OF PREPARATION B 2

Hexamethylene-bis-stearyl-urea

About 51 parts of stearylamine in about 250 parts of acetone are mixed with about 17 parts of hexane-1,6-diisocyanate in about 50 parts of dioxane, and the bis-urea $C_{17}H_{35}$—NH—CO—NH$(CH_2)_6$—NH—CO—NH—$C_{17}H_{35}$ which crystallizes out is separated by suction filtration.

METHOD OF PREPARATION B 3:

1,1-Dimethyl-4-stearyl-semicarbazide

About 190 parts of stearylisocyanate dissolved in about 150 parts of dioxane are added dropwise to a solution of about 42.3 parts of N,N-dimethyl-hydrazine in about 100 parts of dioxane, the stearyldimethyl-semicarbazide $C_{17}H_{35}$—NH—CO—NH—$N(CH_3)_2$ crystallizing out. After recrystallization from dioxane, about 114 parts, of melting point 70° C., are obtained.

METHOD OF PREPARATION B 4

Myristyl-carbamic acid cetyl ester

About 53.1 parts of myristylisocyanate and about 54 parts of cetyl alcohol are heated to boiling in about 150 parts of dioxane for about 15 hours. The precipitate of myristyl carbamic acid cetyl ester precipitated after cooling of the solution is separated by suction filtration and dried in the heat. The urethane (yield 91 parts) has a melting point of 67° C.

METHOD OF PREPARATION B 5

Bis-urethane from 2 mols of stearylisocyanate and 1 mol of butanediol-(1,4)

About 57.5 parts of stearylisocyanate and about 9 parts of butanediol-(1,4) are heated under reflux in about 150 parts of dioxane for about 15 hours. When cold, the precipitate of the bis-urethane $C_{18}H_{37}$—NH—CO—$O(CH_2)_4$—O—CO—NH—$C_{18}H_{37}$ is dried in vacuo and gives a yield of 56 parts m.p. 112° C.

TABLE 1

[Properties of polyurethane urea films]

| Polyurethane urea A | Softening point/ melting point, degrees | Test on elastomer films | | On test rods according to DIN 53504 load values at— | |
|---|---|---|---|---|---|
| | | Tensile strength in kg./cm.² | Elongation at break in percent | 20% in kg./cm.² | 100% elongation in kg./cm.² |
| A/1 | 220-240 | 670 | 570 | 15 | 56 |
| A/2 | 251-258 | 452 | 650 | 22 | 57 |
| A/3 | 270-270 | 640 | 565 | 25 | 64 |
| A/4 | 260-270 | 605 | 615 | 20 | 53 |
| A/5 | 186-200 | 410 | 830 | 25 | 64 |
| A/6 | 212-239 | 830 | 540 | 15 | 76 |
| A/7 | 190-203 | 460 | 625 | 8.3 | 21 |
| A/8 | 210-225 | 750 | 535 | 21 | 80 |
| A/9 | | | | | |
| A/10 | | | | | |
| A/11 | 240-260 | 682 | 595 | 18 | 48 |

Process according to the invention:

EXAMPLE 1

About 40 of a 26.5 percent solution in dimethylformamide of the polyurethane prepared according to A 1 are mixed with about 8 parts (76 percent based on dry polyurethane substance) of stearyl isocyanate and heated to about 90° C. for about 10 minutes. The mixture is then poured on to a stainless steel plate of size 360 cm² which is at a temperature of about 20° C., and after the solution has been spread over the plate it is dipped in water. After about 20 hours' washing, the porous film is taken out of the bath and dried at room temperature. The film obtained has a permeability to water vapor of 1.6 mg/h/cm².

The tests in Table 2 are carried out according to Example 1.

TABLE 2

| Polyurethane according to method | Polyurethane concentration in dimethylformamide (percent) | Addition of stearyl isocyanate (percent based on polyurethane dry substance) | Other additives | Quantity of other additives (percent based on polyurethane) | Heating temperature (° C.) | | Permeability to water vapor (mg./hcm.²) |
|---|---|---|---|---|---|---|---|
| A1 | 17.5 | 1.4 | Dimethylbenzylamine | 0.5 | 65 | 900 | 0.5 |
| A1 | 17.5 | 2.95 | do | 0.5 | 65 | 900 | 1.4 |
| A1 | 17.5 | 7.6 | do | | 60 | 10 | 2.0 |
| A1 | 17.5 | 142 | do | | 75 | 10 | 2.0 |
| A1 | ¹15 | 10 | do | | 80 | 20 | 0.8 |
| A5 | ¹15 | 50 | do | | 80 | 20 | 2.1 |
| A5 | ¹15 | 100 | do | | 80 | 20 | 4.4 |
| A2 | 15 | 10 | do | | 80 | 20 | 0.8 |
| A2 | 15 | 100 | do | | 80 | 20 | 2.6 |
| A4 | 15 | 50 | do | | 80 | 20 | 4.3 |
| A4 | 15 | 100 | do | | 80 | 20 | 5.1 |
| A3 | 15 | 10 | do | | 80 | 20 | 3.0 |
| A3 | 15 | 50 | do | | 80 | 20 | 3.8 |
| A3 | 15 | 100 | do | | 80 | 20 | 4.7 |

¹ Solvent dimethylacetamide.

EXAMPLE 2

A mixture prepared and treated in the manner analogous to Example 1 of polyurethane prepared according to A 1 and stearylisocyanate is dipped in ethanol after it has been painted on to a 400 cm² glass plate. To remove the dimethyl formamide used as solvents, the plate is washed with ethanol. After drying, the resulting microporous film has a permeability to water vapor of 1.1 mg./h./cm².

EXAMPLE 3

About 60 parts of 17.7 percent solution in dimethylformamide of polyurethane prepared according to A 1 are mixed with about 10 parts of a 30 percent solution in tetrahydrofuran of a graft polymer of acrylonitrile, butadiene and styrene (polymer content 28 percent based on the polyurethane solids content) and with about 3 pairs of stearylisocyanate (28.3 percent based on the polyurethane solids content) and exposed to a temperature of about 60° C. The warm mixture is applied by means of a doctor blade to a glass plate of surface area 400 cm², and after cooling to room temperature it is dipped in water to remove the solvent. The microporous film obtained after drying has a permeability to water vapor of 0.8 mg/h/cm².

EXAMPLE 4

About 50 parts of a 15 percent solution of the polyurethane prepared according to A 1 are mixed with about 3.75 parts of solid graft polymer of acrylonitrile, butadiene and styrene (50 percent based on polyurethane solids content) and about 0.75 parts of stearylisocyanate (10 percent based on polyurethane solids content), left to stand at room temperature for about 12 hours and then exposed to a temperature of about 80° C. for about 20 minutes. After this solution has been painted onto a glass plate of surface area 380 cm², the solvent is removed with water. The resulting microporous film has a permeability to water vapor of 0.7 mg/h.cm².

EXAMPLE 5

A film prepared in the manner analogous to Example 4 with about 3.75 parts of a polyvinyl chloride (K-value 60) (50 percent polyvinyl chloride based on polyurethane solids content) has a permeability to water vapor of 2.7 mg/h.cm². On addition of about 2.25 parts (30 percent based on polyurethane solids content) of polyvinyl chloride, a microporous film having a permeability to water vapor to 2.6 mg/h.cm² is obtained.

EXAMPLE 6

About 300 parts of a 25.8 percent solution of the polyurethane prepared according to A 1 are mixed with about 38.7 parts of stearyl isocyanate (50 percent based on polyurethane solids content), about 0.4 part (0.5 percent based on polyurethane solids content) of Acid Yellow 141 (Color Index) and about 77.5 parts of a 30 percent solution of a thermoplastic, hydrolyzed cellulose acetate in dimethylformamide (30 percent based on polyurethane solids content) and exposed for some minutes to a temperature of about 75° C. The a polyurethane polymer or a polyurethane urea polymer in a strong polar solvent which will dissolve

TABLE 3

[The experiments represented in Table 3 are carried out according to Examples 4 and 5]

| Polyurethane according to method | Polyurethane concentration in dimethyl formamide (percent) | Additive | Quantity of additive percent, based on polyurethane solids content | Stearylisocyanate percent based on polyurethane solids content | Heating temperature (° C.) | Heating time (minutes) | Permeability to water vapor (mg./h. cm.²) |
|---|---|---|---|---|---|---|---|
| A4 | 15 | Acrylonitrile-butadiene-styrene graft polymer. | 10 | 10 | 80 | 20 | 1.9 |
| A4 | 15 | ..do.. | 50 | 10 | 80 | 20 | 1.9 |
| A3 | 15 | ..do.. | 10 | 10 | 80 | 20 | 1.2 |
| A4 | 15 | Polyvinyl chloride.. | 10 | 10 | 80 | 20 | 7.3 |
| A4 | 15 | ..do.. | 30 | 01 | 80 | 20 | 8.0 |
| A4 | 15 | ..do.. | 50 | 10 | 80 | 20 | 9.7 |
| A3 | 15 | ..do.. | 10 | 10 | 80 | 20 | 3.9 |
| A3 | 15 | ..do.. | 30 | 10 | 80 | 20 | 4.1 |
| A3 | 15 | ..do.. | 50 | 10 | 80 | 20 | 4.2 | solution is divided into about 3 parts and while still warm, the separate parts are applied to the following surfaces:
 a. a slightly preheated stitched polyamide fiber fleece bonded with latex, having a surface area of 1000 cm² and a thickness of 1.2 mm (weight per square meter 500 g)
 b. 1000 cm² of split leather
 c. 1000 cm² of glass and the solvent is removed with water. The dried materials have the following permeabilities to water vapor:
 a. 1 mg/h.cm²
 b. 1.2 mg/h.cm²
 c. 1.6 mg/h.cm²

EXAMPLE 7

About 72 parts of an 18.5 percent solution in dimethylformamide of the polyurethane prepared according to A 1 are mixed at temperatures of up to about 60° C. with about 3.75 parts (28.2% based on polyurethane solids content) of the finely ground urea prepared according to B 1, and poured onto glass plates of surface area 400 cm². When the solvent has been washed out and the film dried, a microporous film having a permeability to water vapor of 1.1 mg/h.cm² is obtained.

TABLE 4

The following experiments are carried out according to example 7:

| Polyurethane according to method | Additive according to method | Quantity of additive¹ | Permeability to water vapor (mg/h.cm²) |
|---|---|---|---|
| A1 | B2 | 5.65 | 0.8 |
| A1 | B2 | 28.2 | 1.5 |
| A1 | B2 | 39.5 | 2.4 |
| A1 | B3 | 5.65 | 2.5 |
| A1 | B3 | 16.9 | 4.2 |
| A1 | B3 | 28.2 | 5.2 |
| A1 | B3 | 39.5 | 6.6 |
| A11 | B4 | 10 | 1.0 |
| A11 | B5 | 10 | 1.7 |

¹ % based on polyurethane solids content

We claim:
1. A method of preparing microporous polyurethane films and foils which comprises preparing a solution of polyacrylonitrile said polymer containing substantially no free terminal OH or NH₂ groups and having film forming properties and a molecular weight of at least 10,000, introducing into said solution from about 2 to about 200 percent by weight of said polymer of R''—NCO wherein R'' is an alkyl radical having eight to 24 carbon atoms, shaping said solvent solution into a film or foil on a substrate, washing out the solvent and drying the film or foil at a temperature below the softening point of the polyurethane or polyurethane urea polymer.

2. A method according to claim 1 wherein the polyurethane or polyurethane urea polymer is prepared by reacting an organic compound containing active hydrogen atoms that are active with NCO groups, said compound having a molecular weight of from about 500 to 5,000 and a chain extending agent containing active hydrogen atoms that are reactive with NCO groups and having a molecular weight less than about 250 with an organic diisocyanate.

3. A method according to claim 2 wherein the polyurethane or polyurethane urea polymer is prepared by first preparing an NCO terminated prepolymer having an NCO content of at least 0.5 percent by weight in a first step by reacting an excess of the organic diisocyanate with the organic compound having a molecular weight of 500 to 5,000 and reacting said prepolymer with the chain extending agent.

4. A process according to claim 1 wherein a filament having the following physical properties:
 Melting point of Kofler bench at least 150° C.
 Tensile strength at least about 100 kg/cm².
 Elongation at break at least 200 percent.
 Tensile resilience at first elongation to 20 percent at least 1 kg/cm² and at 100% elongation at least 5 kg/cm².
 A molecular weight corresponds to the viscosity $$\eta = \frac{ln_{\eta R}}{C} \geq 0.5$$

when 1.0 g of polymer at 20° C is dissolved in 100 ml of hexamethyl phosphoramide at 20° C. where $\eta_R$ is relative viscosity and C is concentration in g/100 ml. is prepared by applying a solution of the polyurethane or polyurethane urea polymer to a glass plate and drying at 100° C and cutting the resulting film into filaments.

5. The process of claim 4 wherein the viscosity ranges from about 0.7 to about 1.9.

* * * * *